United States Patent
Bellert

(10) Patent No.: US 9,898,653 B2
(45) Date of Patent: Feb. 20, 2018

(54) METHOD FOR DETERMINING WIDTH OF LINES IN HAND DRAWN TABLE

(71) Applicant: Konica Minolta Laboratory U.S.A., Inc., San Mateo, CA (US)

(72) Inventor: Darrell Eugene Bellert, Boulder, CO (US)

(73) Assignee: Konica Minolta Laboratory U.S.A. Inc., San Mateo, CA (US)

( * ) Notice: Subject to any disclaimer, the term of this patent is extended or adjusted under 35 U.S.C. 154(b) by 98 days.

(21) Appl. No.: 15/164,302

(22) Filed: May 25, 2016

(65) Prior Publication Data
US 2017/0344816 A1    Nov. 30, 2017

(51) Int. Cl.
G06K 9/00    (2006.01)
G06K 9/62    (2006.01)
G06T 7/60    (2017.01)

(52) U.S. Cl.
CPC ....... G06K 9/00416 (2013.01); G06K 9/6212 (2013.01); G06T 7/60 (2013.01)

(58) Field of Classification Search
CPC ..... G06K 9/00416; G06K 9/6212; G06T 7/60
See application file for complete search history.

(56) References Cited

U.S. PATENT DOCUMENTS

| | | | | |
|---|---|---|---|---|
| 5,581,633 A | * | 12/1996 | Hotta | G06K 9/348 382/171 |
| 9,275,030 B1 | * | 3/2016 | Fang | G06F 17/245 |
| 2002/0085758 A1 | * | 7/2002 | Ayshi | G06K 9/4604 382/199 |
| 2007/0140565 A1 | * | 6/2007 | Lin | G06K 9/00416 382/203 |
| 2007/0140566 A1 | * | 6/2007 | Lin | G06K 9/00416 382/203 |
| 2009/0245645 A1 | * | 10/2009 | Xing | G06F 17/245 382/189 |
| 2009/0285482 A1 | * | 11/2009 | Epshtein | G06K 9/00463 382/176 |
| 2015/0146985 A1 | * | 5/2015 | Nakasu | G06K 9/222 382/182 |
| 2016/0004422 A1 | * | 1/2016 | Cohen | G06F 3/04883 382/119 |

* cited by examiner

*Primary Examiner* — Jonathan S Lee
(74) *Attorney, Agent, or Firm* — Osha Liang LLP

(57) ABSTRACT

A method for image processing includes obtaining a mask of a stroke from an image; determining a plurality of cross edges for the stroke based on the mask; generating a histogram comprising a plurality of widths of the cross edges and a plurality of frequencies of the plurality of widths from the cross edges; estimating a lower bound of a width range for the stroke based on a mode width of the plurality of widths, a first subset of the plurality of widths below the mode width, and a first plurality of weights assigned to the first subset of the plurality of widths; and estimating an upper bound of the width range for the stroke based on the mode width, a second subset of the plurality of widths above the mode width, and a second plurality of weights assigned to the second subset of the widths.

20 Claims, 8 Drawing Sheets

| | |
|---|---|
| 01 | Initialize *probable_line_width_min* and *probable_line_width_max* to the mode width. |
| 02 | Initialize *tot_widths_seen* to the width histogram for the mode width |
| 03 | Initialize two flags, *scan_lo* and *scan_hi*, to true. |
| 04 | Repeat while (*scan_lo* is true or *scan_hi* is true): |
| 05 |     Initialize *width_thresh* to a user specified percentage of *tot_widths_seen*. |
| |     // The algorithm will need at least these many neighboring widths |
| |     // before changing *probable_line_width_min* or *probable_line_width_max*. |
| 06 |     Initialize *lo_widths_added* to 0. |
| 07 |     If (*scan_lo* is true): |
| 08 |         Set *scan_lo* to false. |
| 09 |         Initialize *scanned_widths_lo* to 0. |
| 10 |         Repeat for every entry below the current *probable_line_width_min* in the width histogram: |
| 11 |             Compute a weight *W* which is 1 / (distance this entry is away from *probable_line_width_min*). |
| 12 |             Add the current entry in the width histogram multiplied by *W* to *scanned_widths_lo*. |
| 13 |             If (*scanned_widths_lo* > *width_thresh*): |
| 14 |                 Decrement *probable_line_width_min* by 1. |
| 15 |                 Add the width histogram at *probable_line_width_min* to *lo_widths_added*. |
| 16 |                 Set *scan_lo* to true. |
| 17 |                 Break out of the loop. |
| 18 |     Initialize *hi_widths_added* to 0. |
| 19 |     If (*scan_hi* is true): |
| 20 |         Set *scan_hi* to false. |
| 21 |         Initialize *scanned_widths_hi* to 0. |
| 22 |         Repeat for every entry above the current *probable_line_width_max* in the width histogram: |
| 23 |             Compute a weight *Q* which is 1 / (distance this entry is away from *probable_line_width_max*). |
| 24 |             Add the current entry in the width histogram multiplied by *Q* to *scanned_widths_hi*. |
| 25 |             If (*scanned_widths_hi* > *width_thresh*): |
| 26 |                 Increment *probable_line_width_max* by 1. |
| 27 |                 Add the width histogram at *probable_line_width_max* to *hi_widths_added*. |
| 28 |                 Set *scan_hi* to true. |
| 29 |                 Break out of the loop. |
| 30 |     Increment *tot_widths_seen* by the sum of (*lo_widths_added* and *hi_widths_added*). |

FIG. 3

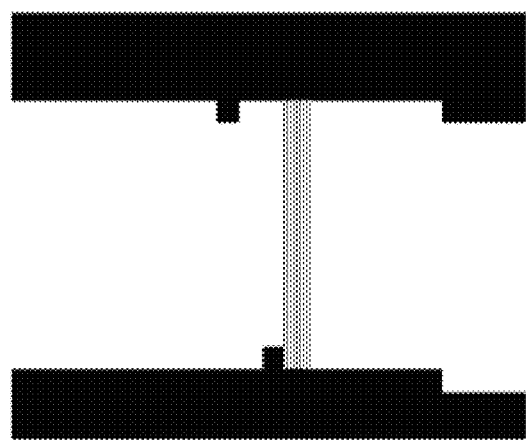
FIG. 4
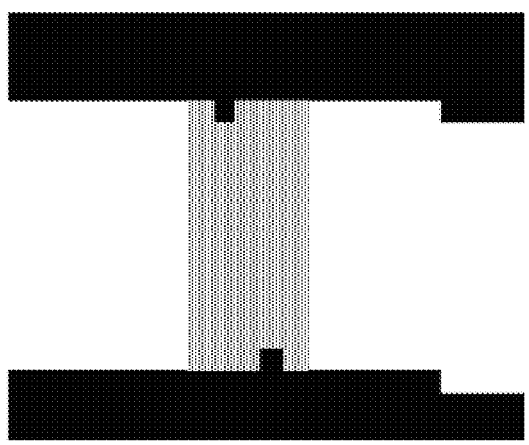
FIG. 5
```
orientation = HORZ
num_edges = 5
width_min = 11
width_max = 12
width_mode = 12
mode_count = 3
width_mean = 11.6
histogram = (11[2] 12[3])
beg = 9
end = 13
probable_line_width_min = 11
probable_line_width_max = 12
```
FIG. 6

| Width | 1 | 2 | 3 | 4 | 5 | 6 | 7 | 8 | 9 | 10 | 11 | 12 | 13 | 14 | 15 | 16 | ... | 159 | 160 |
|---|---|---|---|---|---|---|---|---|---|---|---|---|---|---|---|---|---|---|---|
| Frequency | 2 | 3 | 4 | 2 | 17 | 13 | 6 | 23 | 35 | 20 | 115 | 467 | 28 | 0 | 0 | 0 | ... | 3 | 1 |

METHOD FOR DETERMINING WIDTH OF LINES IN HAND DRAWN TABLE

BACKGROUND

Writing boards such as whiteboards and blackboards are frequently used in many different settings (e.g., academic, corporate, non-profit, residential, etc.). Various content including text, drawings, tables, charts, and graphs may be drawn or placed on the writing boards for lectures, training, brainstorming sessions, etc.

In order to electronically memorialize these ideas, a photograph of the writing board may be taken. Further, image processing such as optical character recognition (OCR), stroke recognition, and reconstruction may be executed to extract the contents of the writing board from the image.

To recognize the content of a table handwritten on a writing board, the image processor or image processing software must locate the pixels that contribute to the "intent" of the table line with various attributes of the table geometry, such as stroke width and line color. Once the cells of the table are identified, the content included in the cells (e.g., text) can be sent to a recognition module (e.g., OCR module).

However, as shown in FIG. 13, handwritten table lines may have irregularities that arise from, e.g., a worn pen tip, irregular ink distribution, or low ink. These irregularities often appear as smudged, broken, or faded segments, which can be captured in the mask as shown in FIG. 14. Nonetheless, it is desirable to be able to identify such segments as a single stroke with a pen for identifying the table line, which enables the content of the table cell to be recognized precisely.

SUMMARY

In general, in one aspect, the invention relates to a method for image processing. The method comprises: obtaining a mask of a stroke from an image; determining a plurality of cross edges for the stroke based on the mask; generating a histogram comprising a plurality of widths of the cross edges and a plurality of frequencies of the plurality of widths from the cross edges; estimating a lower bound of a width range for the stroke based on a mode width of the plurality of widths, a first subset of the plurality of widths below the mode width, and a first plurality of weights assigned to the first subset of the plurality of widths; and estimating an upper bound of the width range for the stroke based on the mode width, a second subset of the plurality of widths above the mode width, and a second plurality of weights assigned to the second subset of the plurality of widths.

In general, in one aspect, the invention relates to a non-transitory computer readable medium (CRM) storing computer readable program code embodied therein. The code: obtains a mask of a stroke from an image; determines a plurality of cross edges for the stroke based on the mask; generates a histogram comprising a plurality of widths of the cross edges and a plurality of frequencies of the plurality of widths from the cross edges; estimates a lower bound of a width range for the stroke based on a mode width of the plurality of widths, a first subset of the plurality of widths below the mode width, and a first plurality of weights assigned to the first subset of the plurality of widths; and estimates an upper bound of the width range for the stroke based on the mode width, a second subset of the plurality of widths above the mode width, and a second plurality of weights assigned to the second subset of the plurality of widths.

In general, in one aspect, the invention relates to an image processing system. The image processing system comprises: a memory; and a processor that: obtains a mask of a stroke from an image; stores the mask in the memory; determines a plurality of cross edges for the stroke based on the mask; generates a histogram comprising a plurality of widths of the cross edges and a plurality of frequencies of the plurality of widths from the cross edges; estimates a lower bound of a width range for the stroke based on a mode width of the plurality of widths, a first subset of the plurality of widths below the mode width, and a first plurality of weights assigned to the first subset of the plurality of widths; and estimates an upper bound of the width range for the stroke based on the mode width, a second subset of the plurality of widths above the mode width, and a second plurality of weights assigned to the second subset of the plurality of widths.

Other aspects of the invention will be apparent from the following description and the appended claims.

BRIEF DESCRIPTION OF DRAWINGS

FIG. 3 shows an algorithm to estimate a range of widths for a stroke in accordance with one or more embodiments of the invention.

FIGS. 4, 5, and 6 show an implementation example in accordance with one or more embodiments of the invention.

DETAILED DESCRIPTION

Figure 1:
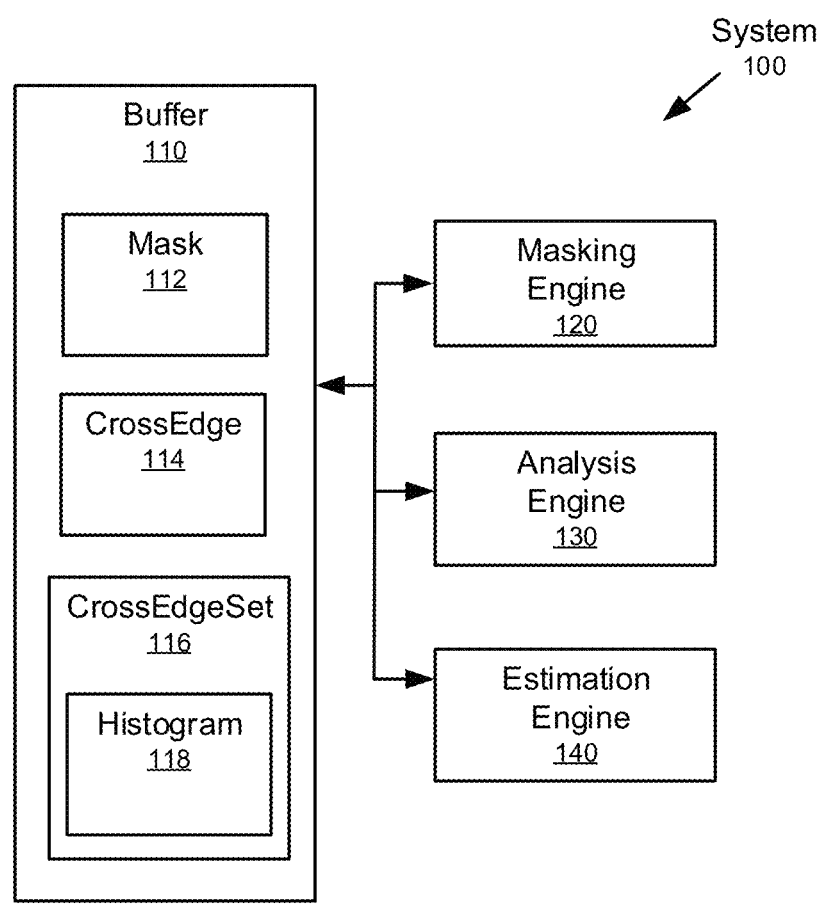
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Embodiments of the invention generally provide a method, a non-transitory computer readable medium (CRM), and a system for image processing, e.g., a process for finding the likely width range of a hand-drawn line.

In general, in order to recognize a table line drawn on a writing board, it is desirable to be able to identify irregular (e.g., smudged, faded, or broken) segments as a single stroke with a pen. For example, some steps for tracing a line on the mask may require a range of probable widths of the line or segments of the line. In one or more embodiments, knowing the probable width range of two segments can aid in determining whether those two segments can be merged. Additionally, knowing such a range can aid in finding portions of the line that are "good" or sufficiently clear (i.e., a region that has widths all within the larger line's width range) so that accurate determinations about the line at that region can be made (such as its momentum). Furthermore, knowing the range can aid in locating intersections with cross lines of the table (i.e., regions where the width is much larger than the probable range). Finally, knowing the range can help locate pixels on both sides of a region of mid-line dropout on the line (i.e., regions where there is a "crack" in the middle of the line, with pixels on either side of the crack, as can be seen on the right side of FIG. 8). In one or more embodiments of the invention, the range of probable line widths may be determined even when the input image of a stroke is poor and has dropouts in the mask.

Initially, according to one or more embodiments, an image of a stroke drawn on a writing board is taken. Then, a mask of the stroke in the image is obtained. The stroke may be a part of a line, a table, a chart, a graph, a text character, etc.

Next, a line tracer traces the stroke and determines a plurality of "cross edges" (i.e., pixels of the line perpendicular to the direction of the stroke) for the stroke. According to one or more embodiments, a class "CrossEdge" is used to record information about a cross edge. For example, the gray vertical strip as shown in FIG. 4 represents a single CrossEdge for one pixel in the mask of the horizontal line.

Further, a set of the cross edges may be generated as a class "CrossEdgeSet." According to one or more embodiments, CrossEdgeSet is a collection of zero or more CrossEdges along with currently known additional information about all of the cross edges in the set (e.g., the orientation of the line, the number of cross edges, the minimum and maximum widths, a histogram of widths, the mode width, etc.). For example, FIG. 5 shows a CrossEdgeSet including five cross edges, and FIG. 6 shows certain "additional information" about those cross edges.

Then, a lower bound and an upper bound of a width range for the stroke are estimated based on the histogram of the widths of the cross edges in an iterative manner. The lower bound is estimated based on the mode width, a subset of a plurality of widths below the mode width, and weights assigned to the widths. Similarly, the upper bound is estimated based on the mode width, a subset of a plurality of widths above the mode width, and weights assigned to the widths. In an iteration according to one or more embodiments, a frequency of a width in the subset is multiplied by the weight, and the product is compared with a threshold to estimate probative lower and upper bounds. Such a calculation is repeated until all of the widths in the histogram are scanned.

Turning now to FIG. 1, a system (100) in accordance with one or more embodiments of the invention includes a buffer (110), a masking engine (120), an analysis engine (130), and an estimation engine (140). Each of these components (110, 120, 130, 140) may be located on the same computing device (e.g., personal computer (PC), laptop, tablet PC, smart phone, server, mainframe, cable box, kiosk, etc.) or may be located on different computing devices connected by a network of any size and any topology having wired and/or wireless segments. The various "engines" may be executed on one or more processors.

In one or more embodiments of the invention, the system (100) includes the buffer (110). The buffer (110) may be implemented in hardware (i.e., circuitry), software, or any combination thereof. The buffer (110) may be of any size or type (e.g., memory, hard drive, etc.). The buffer (110) may store: a mask (112) of a stroke from an image; CrossEdge (114) for recording the cross edges (pixels of the line perpendicular to the direction of the stroke); and CrossEdgeSet (116) as a collection of the cross edges, which includes a histogram (118) of the widths of all cross edges of the stroke.

The image may include a writing board, and a stroke may correspond to a continuous pen marking on the writing board. The mask (112) may be considered a binary image generated by applying a thresholding operation to the image capturing the writing board. As a result of the thresholding operation, irregularities of the stroke may be captured. The stroke may be represented using white pixels in the mask (112), while everything else in the mask (112) may be represented using black pixels. The mask (112) may correspond to all or only a portion of the image. The mask (112) may be generated in the system or obtained (e.g., downloaded) from any source. Further, the mask (112) may be of any size and in any format.

In one or more embodiments of the invention, the system (100) includes the masking engine (120). The masking engine (120) may be implemented in hardware (i.e., circuitry), software, or any combination thereof. The masking engine (120) may read an image capturing the writing board, and apply the thresholding operation to the image to obtain the binary image as a mask (112). The masking engine (120) may store the obtained mask (112) in the buffer (110).

In one or more embodiments of the invention, the system (100) includes the analysis engine (130). The analysis engine (130) may be implemented in hardware (i.e., circuitry), software, or any combination thereof. The analysis engine (130) may read the pixels of the mask (112) and determine a plurality of cross edges in the line by scanning in the positive and negative direction perpendicular to a direction of the line until an off pixel is encountered in the mask. Here, a class CrossEdge may be used to record information about the pixels of a single cross edge and implement a method in order to return its width. FIG. 4 shows a gray vertical strip representing a single cross edge for one pixel in the mask of the horizontal line. In this example, the CrossEdge may record 12 pixels and hence return a width of 12.

After scanning all of the pixels, the analysis engine (130) may generate a CrossEdgeSet (116) based on the CrossEdge (114). As mentioned above, CrossEdgeSet may include additional information about the cross edges in the set. FIG. 6 shows an example of such additional information for the CrossEdgeSet including five cross edges as shown in FIG. 5. "Orientation" represents an orientation of the stroke (e.g., horizontal or vertical); "num_edges" represents the number of cross edges; "width_min" represents the minimum width of cross edges; "width_max" represents the maximum width of cross edges; "width mode" represents a mode of widths; "mode_count" represents the count of the mode width; "width_mean" represents the mean of the widths; "histogram" represents a data structure including all widths and their frequencies; "beg" and "end" represent the extents of CrossEdgeSet; and "probable_line_width_min" and "probable_line_width_max" represent the most likely minimum and maximum width of cross edges. The additional information may be stored as class variables of the CrossEdgeSet.

In the example of FIG. 5, two cross edges have width "11" and three cross edges have width "12." In that case, the analysis engine (130) may generate a data structure "11[2] 12[3]" shown as "histogram" in FIG. 6. The additional information may be updated each time a cross edge is added or removed from the CrossEdgeSet.

In one or more embodiments of the invention, the system (100) includes the estimation engine (140). The estimation engine (140) may be implemented in hardware (i.e., circuitry), software, or any combination thereof. The estimation engine (140) is configured to estimate a lower and an upper bound of a width range for the stroke based on the histogram (118) generated by the analysis engine (130).

In one or more embodiments of the invention, the estimation engine (140) may estimate the lower bound based on a mode width of a plurality of widths included in the histogram (118), a first subset of the plurality of widths below the mode width, and a first plurality of weights assigned to the first subset of the plurality of widths. In addition, the estimation engine (140) may estimate the upper bound based on the mode width, a second subset of the plurality of widths above the mode width, and a second plurality of weights assigned to the second subset of the plurality of widths.

In one or more embodiments of the invention, the estimation engine initializes the lower bound to the mode width. Next, the estimation engine (140) may calculate a first weight for a first width of the first subset based on a distance between the lower bound and the first width, and generate a first product by multiplying the first weight and a frequency corresponding to the first width. Subsequently, the estimation engine (140) may add the first product to a first sum initialized by zero (i.e., the first sum is equal to the first product at this moment), compare the first sum with a width threshold, and decrement the lower bound based on a comparison of the first sum and the width threshold. In one or more embodiments of the invention, the estimation engine (140) may decrement the lower bound when the first sum is greater than the width threshold.

In one or more embodiments of the invention, when the first sum is smaller than or equal to the width threshold, the estimation engine (140) may generate a second weight for a second width of the first subset based on a distance between the lower bound and the second width, and generate a second product by multiplying the second weight and a frequency corresponding to the second width. Then, the estimation engine (140) may add the second product to the first sum, compare the first sum added by the second product with the width threshold, and decrement the lower bound based on a comparison of the first sum added by the second product and the width threshold. In one or more embodiments of the invention, the estimation engine (140) may repeatedly calculate the weights and products for the remaining widths below the mode width and determine if the lower bound may be decremented until the estimation engine (140) finds the first sum greater than the width threshold or has searched all of the remaining widths.

In one or more embodiments of the invention, the estimation engine initializes the upper bound to the mode width. Next, the estimation engine (140) may calculate a third weight for a third width of the second subset based on a distance between the upper bound and the third width, and generate a third product by multiplying the third weight and a frequency corresponding to the third width. Subsequently, the estimation engine (140) may add the third product to a second sum initialized by zero (i.e., the second sum is equal to the third product at this moment), compare the second sum with the width threshold, and increment the upper bound based on a comparison of the second sum and the width threshold. In one or more embodiments of the invention, the estimation engine (140) may increment the upper bound when the second sum is greater than the width threshold.

In one or more embodiments of the invention, when the second sum is smaller than or equal to the width threshold, the estimation engine (140) may generate a fourth weight for a fourth width of the second subset based on a distance between the upper bound and the fourth width, and generate a fourth product by multiplying the fourth weight and a frequency corresponding to the fourth width. Then, the estimation engine (140) may add the fourth product to the second sum, compare the second sum added by the fourth product with the width threshold, and increment the upper bound based on a comparison of the second sum added by the fourth product and the width threshold. In one or more embodiments of the invention, the estimation engine (140) may repeatedly calculate the weights and products for the remaining widths above the mode width and determine if the upper bound may be incremented until the estimation engine (140) finds the second sum greater than the width threshold or has searched all of the remaining widths.

In one or more embodiments of the invention, the estimation engine (140) may update the width threshold based on the first sum, the second sum, and a predetermined percentage. In one or more embodiments of the invention, the estimation engine (140) may calculate the updated width threshold by multiplying a third sum of the first sum and the second sum and the predetermined percentage. In one or more embodiments of the invention, the width threshold may be initialized by a frequency of the mode width, multiplied by the predetermined percentage. In one or more embodiments of the invention, the predetermined percentage may be 5%. Any other percentage may be used for the predetermined percentage.

In one or more embodiments of the invention, the estimation engine (140) may further calculate a fifth weight for a fifth width of the first subset based on a distance between the lower bound and the fifth width, and generate a fifth product by multiplying the fifth weight and a frequency corresponding to the fifth width. Subsequently, the estimation engine (140) may add the fifth product to the first sum reinitialized by zero, and compare the first sum with the updated width threshold to determine if the lower bound may be decremented.

In one or more embodiments of the invention, the estimation engine (140) may further calculate a sixth weight for a sixth width of the second subset based on a distance between the upper bound and the sixth width and generate a sixth product by multiplying the sixth weight and a frequency corresponding to the sixth width. Subsequently, the estimation engine (140) may add the sixth product to the second sum reinitialized by zero, and compare the second sum with the updated width threshold to determine if the upper bound may be incremented.

Although FIG. 1 shows the system (100) as having four components (110, 120, 130, 140), in other embodiments, the system (100) may have more or fewer components. For example, the system (100) may include a scanner or a smart phone with a digital camera to capture the image of the writing board from which the mask (112) is generated. As another example, the system (100) may include additional engines to perform additional image processing (e.g., OCR) on the mask (112) to extract the contents (e.g., text characters) in the mask (112).

Figure 2:
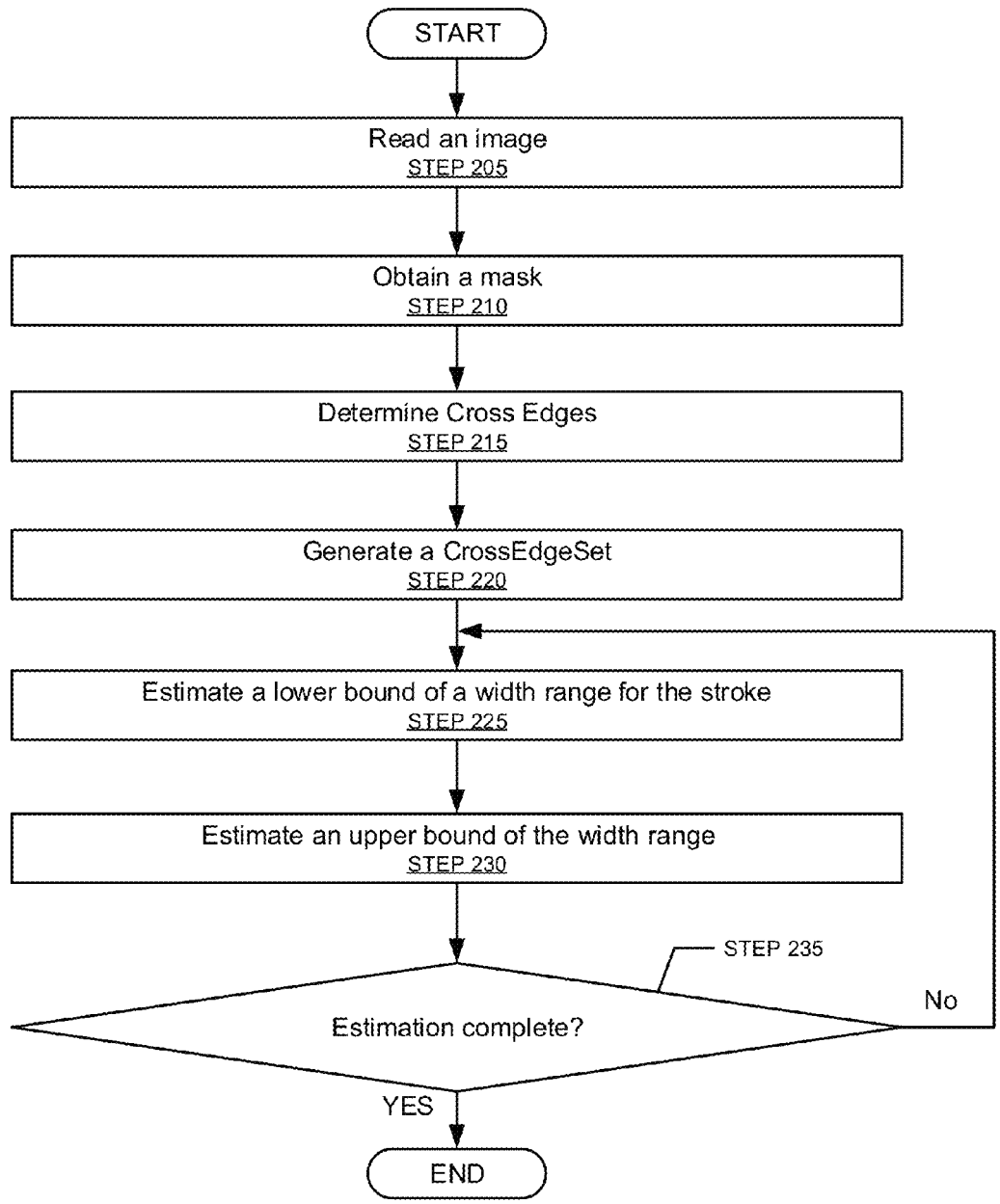
FIG. 2 shows a flowchart in accordance with one or more embodiments of the invention.

FIG. 2 shows a flowchart in accordance with one or more embodiments of the invention. The flowchart depicts a process for image processing. One or more of the steps in FIG. 2 may be performed by the components (110, 120, 130, 140) of the system (100), discussed above in reference to FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, the masking engine (120) may read an image capturing a writing board (STEP 205). The image may include a stroke of a hand-drawn table on the writing board. The image may be of any size or format. The image may be obtained from outside of the system (100). Alternatively, the image may be stored on a memory of the system (100) in advance.

In STEP 210, the masking engine (120) may obtain or generate a mask (112) from the image. The mask may be of any size or format. The mask may correspond to the entire image or only a portion of the image. The masking engine (120) may store the mask (112) in the buffer (110).

In STEP 215, the analysis engine (130) may determine a plurality of cross edges on the mask by scanning in the positive and negative direction perpendicular to a direction of the line. The analysis engine (130) may use CrossEdge to record the cross edge pixels including width information. The analysis engine (130) may store an instance of CrossEdge in the buffer (110).

In STEP 220, the analysis engine (130) may generate an instance of another class CrossEdgeSet storing the set of all cross edges found for a line including additional information about the determined cross edges. For example, the analysis engine (130) may generate a histogram (118) of widths of the cross edges in the set. Thus, the histogram (118) includes the widths and their frequencies for all of the cross edges. The analysis engine (130) may store the instance of CrossEdgeSet in the buffer (110).

In STEP 225, the estimation engine (140) may estimate a lower bound of a width range for the stroke based on a mode width of a plurality of widths included in the histogram (118), a first subset of the plurality of widths below the mode width, and a first plurality of weights assigned to the first subset of the plurality of widths. As discussed above, the estimation engine (140) may calculate a first weight for a first width of the first subset based on a distance between the lower bound and the first width, and generate a first product by multiplying the first weight and a frequency corresponding to the first width. Subsequently, the estimation engine (140) may add the first product to a first sum initialized by zero, compare the first sum with a width threshold, and decrement the lower bound based on a comparison of the first sum and the width threshold.

In STEP 230, the estimation engine (140) may estimate an upper bound of a width range based on the mode width, a second subset of the plurality of widths above the mode width, and a second plurality of weights assigned to the second subset of the plurality of widths. As discussed above, the estimation engine (140) may calculate a third weight for a third width of the second subset based on a distance between the upper bound and the third width, and generate a third product by multiplying the third weight and a frequency corresponding to the third width. Subsequently, the estimation engine (140) may add the third product to a second sum initialized by zero, compare the second sum with the width threshold, and increment the upper bound based on a comparison of the second sum and the width threshold.

In STEP 235, the estimation engine (140) may determine if all of the widths included in the histogram (118) are scanned and the estimation has completed. If not, the process may return to STEP 225 and the estimation engine (140) may continue to find a lower minimum width and a greater maximum width from the histogram (118).

Figure 7:
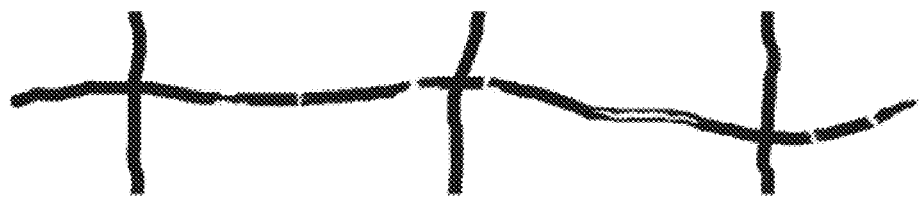
FIG. 7 shows an example of a stroke to be processed in accordance with one or more embodiments of the invention.
Figure 8:
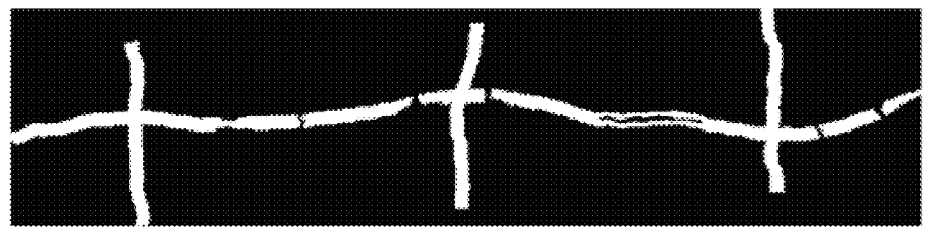
FIG. 8 shows an example of a mask obtained in accordance with one or more embodiments of the invention.

FIG. 3 shows an algorithm to estimate a range of widths for a stroke in accordance with one or more embodiments of the invention. With reference to FIG. 3, the details of the algorithm executed by the estimation engine (140) are described while showing an example of actual calculation. In this example, the image shown in FIG. 7 is read, and the mask shown in FIG. 8 is obtained by the masking engine (120). As shown in these figures, the input has some broken parts, cracks, smudges, and other discontinuities.

Figure 9:
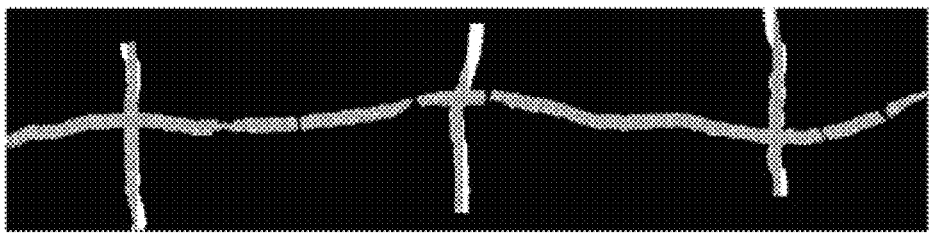
FIG. 9 shows a plurality of cross edges determined in a mask in accordance with one or more embodiments of the invention.
Figures 10, 11:
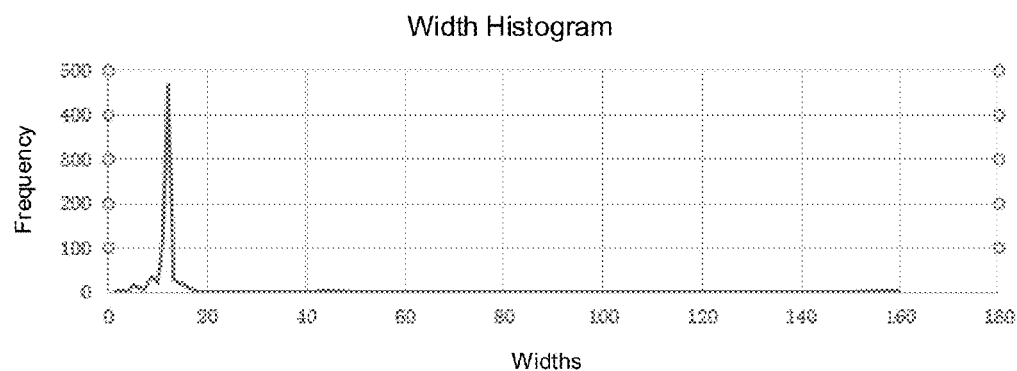
FIGS. 10 and 11 show an example of a histogram in accordance with one or more embodiments of the invention.

In order to treat broken segments as a single line and find the likely pixel width boundaries for this line, the analysis engine (130) may first generate an instance of CrossEdgeSet as shown in grey in FIG. 9. In that process, the analysis engine (130) may generate a histogram (118) of the widths of the cross edges. FIGS. 10 and 11 show an example of the histogram (118) generated based on the CrossEdgeSet shown in FIG. 9. FIG. 10 shows a graph illustrating the frequency distribution of the widths of the CrossEdges in the CrossEdgeSet. FIG. 11 shows a table representing some of the widths and their frequency. Those figures show that the majority of widths are concentrated from 5 to 13 pixels. The algorithm shown in FIG. 3 may estimate this range of the width.

Initially, at LINE 01, variables probable_line_width_min and probable_line_width_max indicating a probable minimum and maximum line widths are initialized to the mode width, which is 12 as shown in FIG. 11.

At LINE 02, tot_widths_seen, which represents the total number of widths that have been scanned, is initialized to 467 (i.e., the value for the mode in the histogram).

At LINE 03, two scanning flags scan_lo and scan_hi are initialized to true.

At LINE 04, it is determined that at least one of the two scanning flags is true, and LINEs 04-30 are executed while this condition is met. Here, since both of the scanning flags are true, the first iteration of the loop may be executed.

At LINE 05, a width threshold width_thresh, which needs to be met in order to expand probable_line_width_min and probable_line_width_max, is established. The threshold is defined as a predetermined percentage of the total number of scanned widths. Provided that the percentage is 5% (i.e., 0.05), the threshold is set to 467*0.05=23.

At LINE 06, a variable lo_widths_added is initialized to 0.

At LINE 07, since the flag scan_lo is true, the process goes to LINEs 08 and 09 where the flag scan_lo is set to false and a variable scanned_widths_lo is initialized to 0.

At LINEs 10-17, the process is repeated for every entry (width) below the current probable_line_width_min in the histogram.

At LINE 11, a weight W is computed. In this example, since the entry 11 is 1 away from 12, the weight W is set to 1/1=1.

At LINE 12, the current entry in the width histogram is multiplied by W, and then added to scanned_widths_lo. In this example, the histogram entry (or frequency) 115 at width 11 is multiplied by the weight 1, and the product is added to scanned_widths_lo, which brings the value up to 115.

At LINE 13, it is determined if scanned_widths_lo is greater than width_thresh. Here, since scanned_widths to is greater than the width threshold of 23, the process proceeds to LINEs 14-17.

At LINE 14, probable_line_width_min is decremented by 1. Here, probable_line_width_min is decremented to 11.

At LINE 15, the width histogram at probable_line_width_min is added to lo_widths_added. Here, the histogram entry at probable_line_width_min (115) is added to lo_widths_added, bringing it up to 115.

At LINE 16, scan_lo is set to true so that the scan on the next iteration can be executed, and at LINE 17, the process breaks out of the loop (i.e., LINEs 10-17).

At LINE 18, a variable hi_widths_added is initialized to 0.

At LINE 19, it is determined if the flag scan_hi is true. Here, because scan_hi is true, the process proceeds to LINEs 20-21 where scan_hi is set to false and a variable scanned_widths_hi is initialized to 0.

At LINEs 22-29, the process is repeated for every entry (width) above the current probable_line_width_max in the histogram.

At LINE 23, a weight Q is computed. In this example, since the entry 13 is 1 away from 12, the weight Q is set to 1/1=1.

At LINE 24, the current entry in the width histogram is multiplied by Q, and then added to scanned_widths_hi. Here, the histogram entry at 13 (28) is multiplied by the weight 1, and the product is added to scanned_widths_hi, which brings the value up to 28.

At LINE 25, it is determined if scanned_widths_hi is greater than the width_thresh. Here, since scanned_widths_hi is greater than the width threshold of 23, the process proceeds to LINEs 26-29.

At LINE 26, probable_line_width_max is incremented by 1. Here, probable_line_width_max is incremented to 13.

At LINE 27, the width histogram at probable_line_width_max is added to hi_widths_added. Here, the histogram entry at probable_line_width_max (28) is added to hi_widths_added, bringing it up to 28.

At LINE 28, scan_hi is set to true so that the scanning on the next iteration can be continued, and at LINE 29, the process breaks out of the loop.

At LINE 30, tot_widths_seen is incremented with the total of the widths scanned on this iteration, which is the sum of lo_widths_added and hi_widths_added. Here, tot_widths_seen is incremented with the sum of lo_widths_added (115) and hi_widths_added (28), bringing it up to 610.

Again, at LINE 04, it is determined that at least one of the two scanning flags is true, and here, since at least one of the two scanning flags scan_lo and scan_hi is true, the process enters the second iteration of the loop.

At LINE 05, based on the current tot_widths_seen (610) and the predetermined percentage (5%), width_thresh is initialized to 610*0.05=30.

At LINEs 06-09, lo_widths_added is initialized to 0, scan_lo is set to false, and scanned_widths_lo is initialized to 0. Then, at LINEs 10-17, every histogram entry below 11 is scanned as follows.

Since entry 10 is 1 away from 11, the weight W is set to 1/1=1. Then, the histogram entry at 10 (20) is multiplied by the weight 1, and the product is added to scanned_widths_lo, which brings the value up to 20. Here, since scanned_widths_lo is not greater than width_thresh (30), LINEs 14-17 are not executed and the execution returns to LINE 11.

Since entry 9 is 2 away from 11, the weight W is set to 1/2=0.5. Then, the histogram entry at 9 (35) is multiplied by the weight 0.5, and the product is added to scanned_widths_lo, which brings the value up to 37. Here, since scanned_widths_lo is greater than the width threshold of 30, LINEs 14-17 are executed.

In LINEs 14-17, probable_line_width_min is decremented to 10, and the histogram entry at probable_line_width_min (20) is added to lo_widths_added, bringing it up to 20. Then, scan_lo is set to true so that the scan on the next iteration may be continued, and the process proceeds to LINE 18.

At LINEs 18-21, hi_widths_added is initialized to 0, scan_hi is set to false, and scanned_widths_hi is initialized to 0. Then, at LINEs 22-29, every histogram entry above 13 is scanned as follows.

Since entry 14 is 1 away from 13, the weight Q is set to 1/1=1. The histogram entry at 14 (0) is multiplied by the weight 1, and the product is added to scanned_widths_hi, which brings the value up to 0.

Since entry 15 is 2 away from 13, the weight Q is set to 1/2=0.5. The histogram entry at 15 (0) is multiplied by the weight 0.5, and the product is added to scanned_widths_hi, which brings the value up to 0.

Since entry 16 is 3 away from 13, the weight Q is set to 1/3=0.3. The histogram entry at 16 (0) is multiplied by the weight 0.3, and the product is added to scanned_widths_hi, which brings the value up to 0.

The similar calculation is repeated, and finally, since entry 160 is 147 away from 13, the weight Q is set to 1/147=0.007. The histogram entry at 160 (1) is multiplied by the weight 0.007, and the product is added to scanned_widths_hi, which brings the value up to 0.

Now all entries in the histogram above 13 have been scanned, and no width has been found to surpass the threshold. As a result, probable_line_width_max remains unchanged and scan_hi remains false.

At LINE 30, tot_widths_seen is incremented with the total of the widths scanned on this iteration, which is the sum of lo_widths_added (20) and hi_widths_added (0), bringing it up to 630.

Again, since at least one of the two scanning flags (i.e., scan_lo) is true, the process enters the third iteration of the loop.

At LINE 05, width_thresh is increased to 630*0.05=31.

At LINEs 06-09, lo_widths_added is initialized to 0, scan_lo is set to false, and scanned_widths_lo is initialized to 0. Then, at LINEs 10-17, every histogram entry below 10 is scanned as below.

Since entry 9 is 1 away from 10, the weight W is set to 1/1=1. The histogram entry at 9 (35) is multiplied by the weight 1, and the product is added to scanned_widths_lo, which brings the value up to 35. Since scanned_widths_lo is greater than the width_thresh (31), LINEs 14-17 are executed.

At LINE 14, probable_line_width_min is decremented to 9, and at LINE 15, the histogram entry at probable_line_width_min (35) is added to lo_widths_added, bringing it up to 35. At LINE 16, scan_lo is set to true so that the scan on the next iteration may be continued.

At LINE 19, since scan_hi is false, LINEs 20-29 are skipped. At LINE 30, tot_widths_seen is incremented with the total of the widths scanned on this iteration, which is lo_widths_added (35), bringing it up to 665.

At LINE 04, the scanning flag scan_lo is still true, the process enters the fourth iteration of the loop.

At LINE 05, width_thresh is initialized to 665*0.05=33.

At LINEs 06-09, lo_widths_added is initialized to 0, scan_lo is set to false, and scanned_widths_lo is initialized to 0, and at LINEs 10-17, every histogram entry below 9 is scanned.

Since entry 8 is 1 away from 9, the weight W is set to 1/1=1. The histogram entry at 8 (23) is multiplied by the weight 1, and the product is added to scanned_widths_lo, which brings the value up to 23.

Since entry 7 is 2 away from 9, the weight W is set to 1/2=0.5. The histogram entry at 7 (6) is multiplied by the weight 0.5, and the product is added to scanned_widths_lo, which brings the value up to 26.

Since entry 6 is 3 away from 9, the weight W is set to 1/3=0.3. The histogram entry at 6 (13) is multiplied by the weight 0.3, and the product is added to scanned_widths_lo, which brings the value up to 30.

Since entry 5 is 4 away from 9, the weight W is set to 1/4=0.25. The histogram entry at 5 (17) is multiplied by the weight 0.25, and the product is added to scanned_widths_lo, which brings the value up to 34.

Since scanned_widths_lo is greater than the width_thresh (31), probable_line_width_min is decremented to 8, and the histogram entry at probable_line_width_min (23) is added to lo_widths_added, bringing it up to 23. Again, scan_lo is set to true. After skipping LINEs 19-29, tot_widths_seen is incremented with the total of the widths scanned on this iteration, which is lo_widths_added (23), bringing it up to 688.

Again, the scanning flag scan_lo is still true, the process enters the fifth iteration of the loop. In this iteration, width_thresh is initialized to 688*0.05=34. Similarly, lo_widths_added is initialized to 0, scan_lo is set to false, and scanned_widths_lo is initialized to 0. Every histogram entry below 8 is scanned.

Since entry 7 is 1 away from 8, the weight W is set to 1/1=1. The histogram entry at 7 (6) is multiplied by the weight 1, and the product is added to scanned_widths_lo, which brings the value up to 6.

Since entry 6 is 2 away from 8, the weight W is set to 1/2=0.5. The histogram entry at 6 (13) is multiplied by the weight 0.5, and the product is added to scanned_widths_lo, which brings the value up to 12.

Since entry 5 is 3 away from 8, the weight W is set to 1/3=0.3. The histogram entry at 5 (17) is multiplied by the weight 0.3, and the product is added to scanned_widths_lo, which brings the value up to 17.

The similar calculation is repeated, and finally, since entry 1 is 7 away from 8, the weight W is set to 1/7=0.14. The histogram entry at 1 (2) is multiplied by the weight 0.14, and the product is added to scanned_widths_lo, which brings the value up to 17.

All entries below 8 have been scanned, and no widths has been found to surpass the threshold. Thus, probable_line_width_min remains unchanged and scan_lo remains false.

The algorithm ends with probable_line_width_min set to 8 and probable_line_width_max set to 13. This indicates that the bulk of the line width samples are between 8 and 13. This range can be used to assist in the merging of lines, finding intersections, finding regions of the line that are "good", detecting cracks in lines, etc.

According to the above algorithm, all the neighboring values of the histogram (118) are considered with diminishing importance in deciding whether or not to increment or decrement the width range. For example, in the fourth iteration above, when deciding whether to decrement probable_line_width_min from 9 to 8, the reduced weights of entries 5 and 6 in the histogram (118) are enough to cause the algorithm to cross the threshold. Hence, there is enough support in this area to justify decrementing the range. This feature allows the algorithm to be tolerant of poorly drawn lines since smudges or gaps are allowed to contribute to the calculation. For example, just one smudge might be ignored but a handful of smudges can make a contribution to the determined width and affect the resulting width ranges.

Additionally, in the above approach, the threshold increases on every iteration of the algorithm. This makes it inherently more difficult to change the range on each iteration, and can be done only when there is enough neighboring evidence to update the range.

As stated above, in one or more embodiments of the invention, the likely width range may be identified for a portion of a hand drawn line. Even though a poor quality mask for the line is given, the embodiments allow a table analyzer, which tries to identify table lines to send the content of the cell to another recognition engine, to be forgiving of various errors in the mask by focusing on regions where the width is known to be good; aid in determining whether or not two separate segments can be merged; assist in repairing some portions of the mask; and assist in locating intersections with cross lines of the table.

Figure 12:
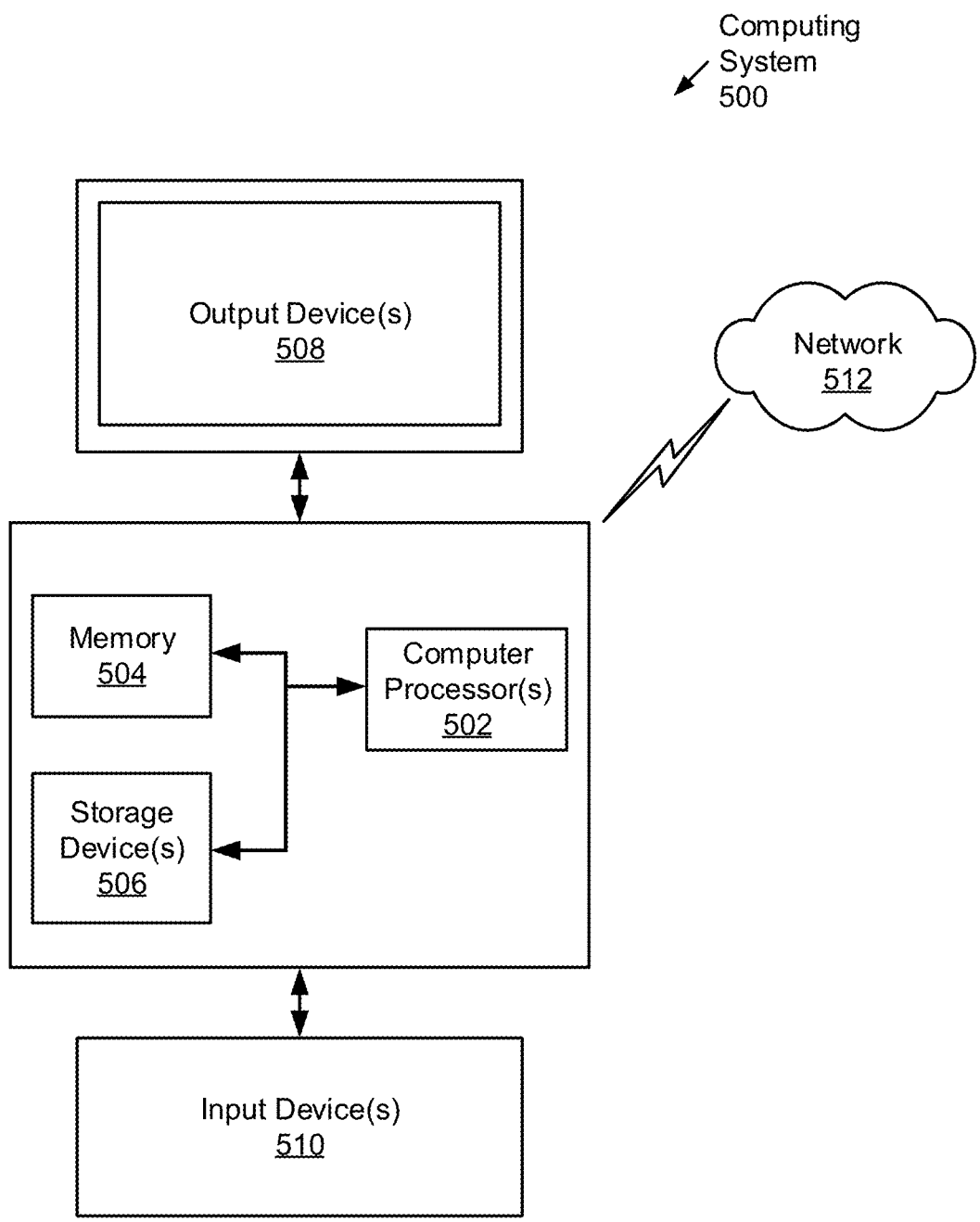
FIG. 12 shows a computer system in accordance with one or more embodiments of the invention.
Figure 13:
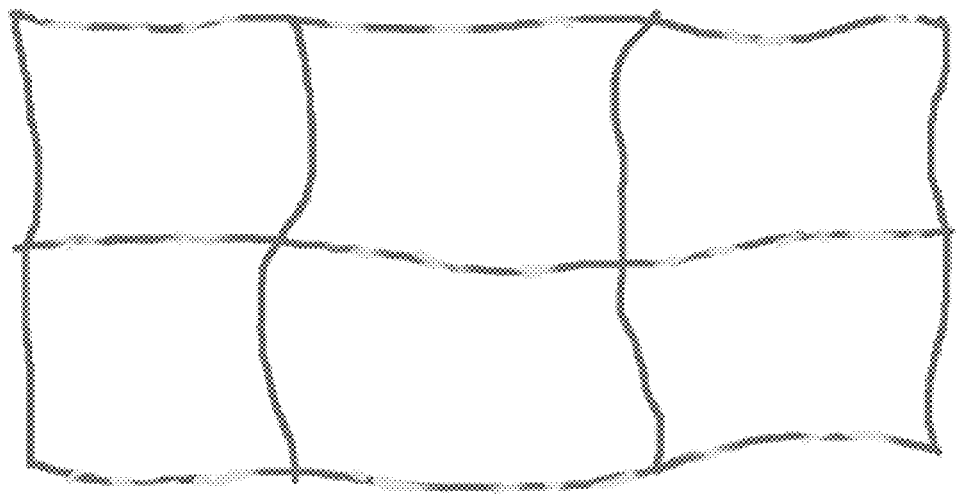
FIG. 13 shows an example of a hand-drawn table on a writing board.
Figure 14:
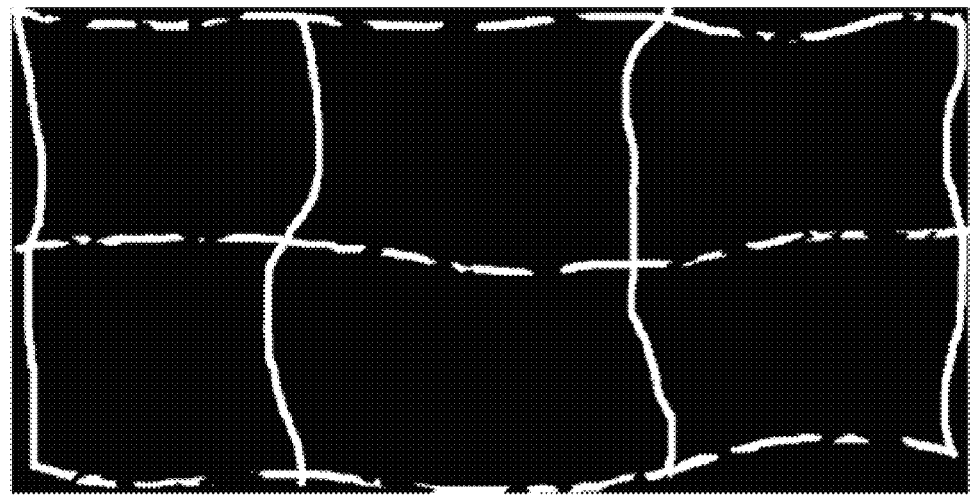
FIG. 14 shows an example of a mask image of a hand-drawn table.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 12, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and connected to the other elements over a network (512). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for image processing, comprising:
   obtaining a mask of a stroke from an image;
   determining a plurality of cross edges for the stroke based on the mask;
   generating a histogram comprising a plurality of widths of the cross edges and a plurality of frequencies of the plurality of widths from the cross edges;
   estimating a lower bound of a width range for the stroke based on
      a mode width of the plurality of widths,
      a first subset of the plurality of widths below the mode width, and
      a first plurality of weights assigned to the first subset of the plurality of widths; and
   estimating an upper bound of the width range for the stroke based on the mode width,
      a second subset of the plurality of widths above the mode width, and
      a second plurality of weights assigned to the second subset of the plurality of widths.

2. The method of claim 1, wherein estimating the lower bound comprises:
   calculating a first weight for a first width of the first subset based on a distance between the lower bound and the first width, wherein the lower bound is initialized by the mode width;
   generating a first product by multiplying the first weight and a frequency corresponding to the first width;
   adding the first product to a first sum initialized by zero;
   comparing the first sum with a width threshold; and
   decrementing the lower bound when the first sum is greater than the width threshold.

3. The method of claim 2, wherein when the first sum is smaller than or equal to the width threshold, estimating the lower bound further comprises:
   generating a second weight for a second width of the first subset based on a distance between the lower bound and the second width;
   generating a second product by multiplying the second weight and a frequency corresponding to the second width;
   adding the second product to the first sum;
   comparing the first sum added by the second product with the width threshold; and
   decrementing the lower bound when the first sum added by the second product is greater than the width threshold.

4. The method of claim 1, wherein estimating the upper bound comprises:
   calculating a third weight for a third width of the second subset based on a distance between the upper bound and the third width, wherein the upper bound is initialized by the mode width;
   generating a third product by multiplying the third weight and a frequency corresponding to the third width;
   adding the third product to a second sum initialized by zero;
   comparing the second sum with a width threshold; and
   incrementing the upper bound when the second sum is greater than the width threshold.

5. The method of claim 4, wherein when the second sum is smaller than or equal to the width threshold, estimating the upper bound further comprises:
   generating a fourth weight for a fourth width of the second subset based on a distance between the upper bound and the fourth width;
   generating a fourth product by multiplying the fourth weight and a frequency corresponding to the fourth width;
   adding the fourth product to the second sum;
   comparing the second sum added by the fourth product with the width threshold; and
   incrementing the upper bound when the second sum added by the fourth product is greater than the width threshold.

6. The method of claim 2, wherein the width threshold is initialized by a frequency of the mode width, multiplied by a predetermined percentage.

7. The method of claim 6, wherein
the predetermined percentage is 5%.

8. The method of claim 2, further comprising updating the width threshold based on the first sum and a predetermined percentage, wherein estimating the lower bound further comprises:
   calculating a fifth weight for a fifth width of the first subset based on a distance between the lower bound and the fifth width;
   generating a fifth product by multiplying the fifth weight and a frequency corresponding to the fifth width;
   adding the fifth product to the first sum reinitialized by zero;
   comparing the first sum added by the fifth product with the updated width threshold; and
   decrementing the lower bound when the first sum added by the fifth product is greater than the updated width threshold.

9. The method of claim 4, further comprising updating the width threshold based on the second sum and a predetermined percentage, wherein estimating the upper bound further comprises:
- calculating a sixth weight for a sixth width of the second subset based on a distance between the upper bound and the sixth width;
- generating a sixth product by multiplying the sixth weight and a frequency corresponding to the sixth width;
- adding the sixth product to the second sum reinitialized by zero;
- comparing the second sum added by the sixth product with the updated width threshold; and
- incrementing the upper bound when the second sum added by the sixth product is greater than the updated width threshold.

10. The method of claim 2, wherein estimating the upper bound comprises:
- calculating a third weight for a third width of the second subset based on a distance between the upper bound and the third width;
- generating a third product by multiplying the third weight and a frequency corresponding to the third width;
- adding the third product to a second sum initialized by zero;
- comparing the second sum with the width threshold; and
- incrementing the upper bound when the second sum is greater than the width threshold, and
- the upper bound is initialized by the mode width.

11. The method of claim 10, further comprising updating the width threshold with a sum of the first sum and the second sum, multiplied by a predetermined percentage.

12. A non-transitory computer readable medium (CRM) storing computer readable program code embodied therein that:
- obtains a mask of a stroke from an image;
- determines a plurality of cross edges for the stroke based on the mask;
- generates a histogram comprising a plurality of widths of the cross edges and a plurality of frequencies of the plurality of widths from the cross edges;
- estimates a lower bound of a width range for the stroke based on
  - a mode width of the plurality of widths,
  - a first subset of the plurality of widths below the mode width, and
  - a first plurality of weights assigned to the first subset of the plurality of widths; and
- estimates an upper bound of the width range for the stroke based on the mode width,
  - a second subset of the plurality of widths above the mode width, and
  - a second plurality of weights assigned to the second subset of the plurality of widths.

13. The non-transitory CRM of claim 12, wherein estimating the lower bound comprises:
- calculating a first weight for a first width of the first subset based on a distance between the lower bound and the first width, wherein the lower bound is initialized by the mode width;
- generating a first product by multiplying the first weight and a frequency corresponding to the first width;
- adding the first product to a first sum initialized by zero;
- comparing the first sum with a width threshold; and
- decrementing the lower bound when the first sum is greater than the width threshold.

14. The non-transitory CRM of claim 13, wherein when the first sum is smaller than or equal to the width threshold, estimating the lower bound further comprises:
- generating a second weight for a second width of the first subset based on a distance between the lower bound and the second width;
- generating a second product by multiplying the second weight and a frequency corresponding to the second width;
- adding the second product to the first sum;
- comparing the first sum added by the second product with the width threshold; and
- decrementing the lower bound when the first sum added by the second product is greater than the width threshold.

15. The non-transitory CRM of claim 12, wherein estimating the upper bound comprises:
- calculating a third weight for a third width of the second subset based on a distance between the upper bound and the third width, wherein the upper bound is initialized by the mode width;
- generating a third product by multiplying the third weight and a frequency corresponding to the third width;
- adding the third product to a second sum initialized by zero;
- comparing the second sum with a width threshold; and
- incrementing the upper bound when the second sum is greater than the width threshold.

16. The non-transitory CRM of claim 15, wherein when the second sum is smaller than or equal to the width threshold, estimating the upper bound further comprises:
- generating a fourth weight for a fourth width of the second subset based on a distance between the upper bound and the fourth width;
- generating a fourth product by multiplying the fourth weight and a frequency corresponding to the fourth width;
- adding the fourth product to the second sum;
- comparing the second sum added by the fourth product with the width threshold; and
- incrementing the upper bound when the second sum added by the fourth product is greater than the width threshold.

17. The non-transitory CRM of claim 13, wherein the width threshold is initialized by a frequency of the mode width, multiplied by a predetermined percentage.

18. The non-transitory CRM of claim 13, wherein
the computer readable program code further updates the width threshold based on the first sum and a predetermined percentage, and
estimating the lower bound further comprises:
- calculating a fifth weight for a fifth width of the first subset based on a distance between the lower bound and the fifth width;
- generating a fifth product by multiplying the fifth weight and a frequency corresponding to the fifth width;
- adding the fifth product to the first sum reinitialized by zero;
- comparing the first sum added by the fifth product with the updated width threshold; and decrementing the lower bound when the first sum added by the fifth product is greater than the updated width threshold.

19. The non-transitory CRM of claim 15, wherein the computer readable program code further updates the width threshold based on the second sum and a predetermined percentage, and estimating the upper bound further comprises:

calculating a sixth weight for a sixth width of the second subset based on a distance between the upper bound and the sixth width;

generating a sixth product by multiplying the sixth weight and a frequency corresponding to the sixth width;

adding the sixth product to the second sum reinitialized by zero;

comparing the second sum added by the sixth product with the updated width threshold; and incrementing the upper bound when the second sum added by the sixth product is greater than the updated width threshold.

20. An image processing system comprising:

a memory; and a processor that:

obtains a mask of a stroke from an image;

stores the mask in the memory;

determines a plurality of cross edges for the stroke based on the mask;

generates a histogram comprising a plurality of widths of the cross edges and a plurality of frequencies of the plurality of widths from the cross edges;

estimates a lower bound of a width range for the stroke based on a mode width of the plurality of widths, a first subset of the plurality of widths below the mode width, and a first plurality of weights assigned to the first subset of the plurality of widths; and estimates an upper bound of the width range for the stroke based on the mode width, a second subset of the plurality of widths above the mode width, and a second plurality of weights assigned to the second subset of the plurality of widths.

\* \* \* \* \*